United States Patent [19]

Holland

[11] Patent Number: 5,089,712
[45] Date of Patent: Feb. 18, 1992

[54] SHEET ADVANCEMENT CONTROL SYSTEM DETECTING FIBER PATTERN OF SHEET

[75] Inventor: William D. Holland, Palo Alto, Calif.

[73] Assignee: Hewlett-Packard Company, Palo Alto, Calif.

[21] Appl. No.: 363,250

[22] Filed: Jun. 8, 1989

[51] Int. Cl.⁵ ............................................. G01N 21/86
[52] U.S. Cl. .................................... 250/557; 250/561
[58] Field of Search .................. 250/548, 557, 561; 355/244; 364/518, 519; 226/45

[56] References Cited

U.S. PATENT DOCUMENTS

| | | | |
|---|---|---|---|
| 3,914,595 | 10/1975 | Tinet | 250/557 |
| 3,919,560 | 11/1975 | Nopper | 250/557 |
| 4,373,816 | 2/1983 | Laib | 250/561 |
| 4,484,079 | 11/1984 | Betz et al. | 226/45 |
| 4,683,380 | 7/1987 | Shipkowski et al. | 250/548 |
| 4,937,593 | 6/1990 | Prats | 250/548 |

*Primary Examiner*—David C. Nelms
*Assistant Examiner*—S. Allen

[57] ABSTRACT

A sheet advancement control system for use in printers such as inkjet printers includes a light source for directing a beam of light onto a localized area of a sheet, a photosensitive detector for providing output signals that vary according to microscopic patterns that are illuminated within the sheet by the directed light, a correlator for determining cross-correlations between pairs of detected patterns as the sheet is advanced in a printer and for computing displacements between matching patterns to, thereby, detect the displacement of a sheet within the printer.

12 Claims, 3 Drawing Sheets

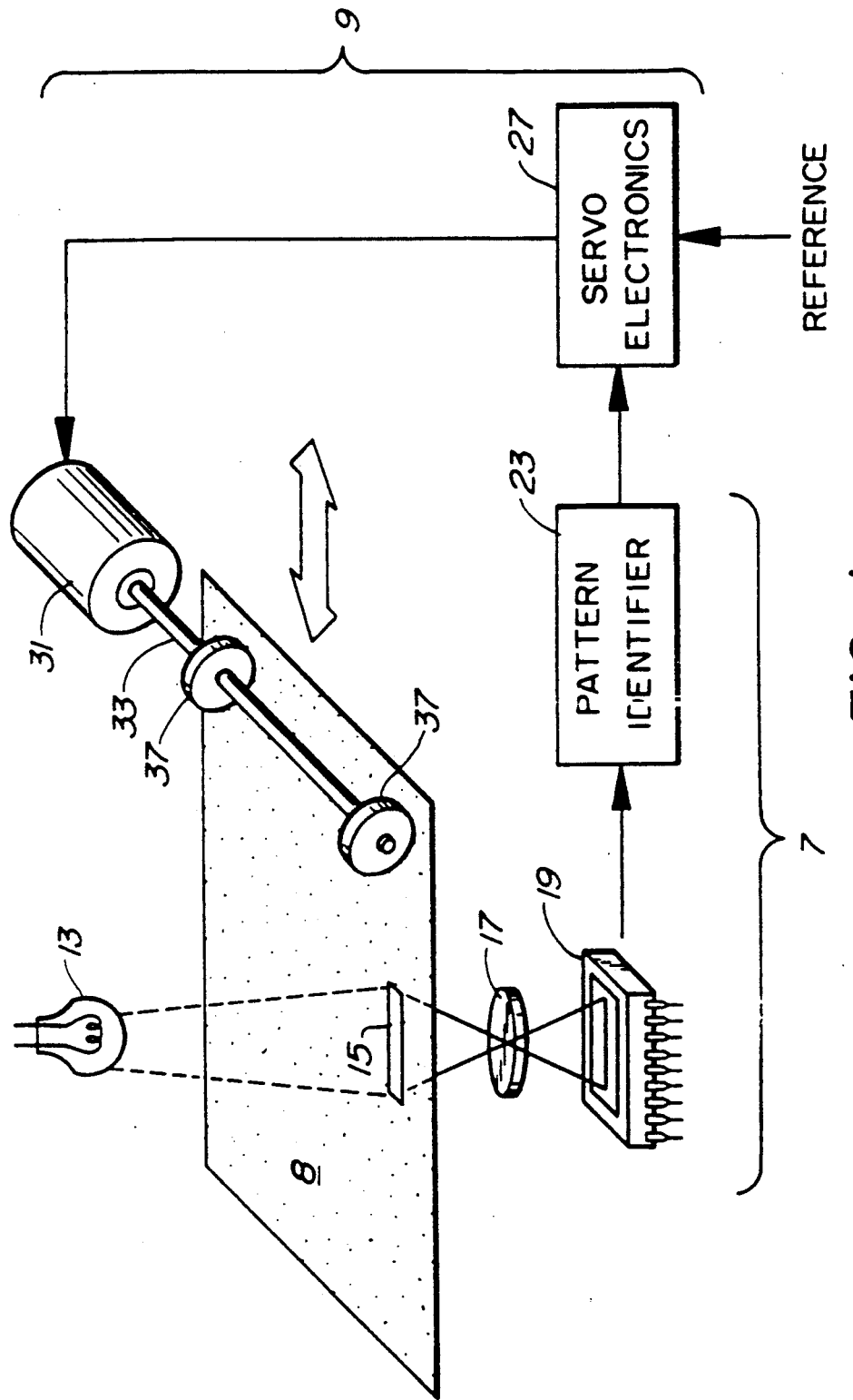
FIG._1

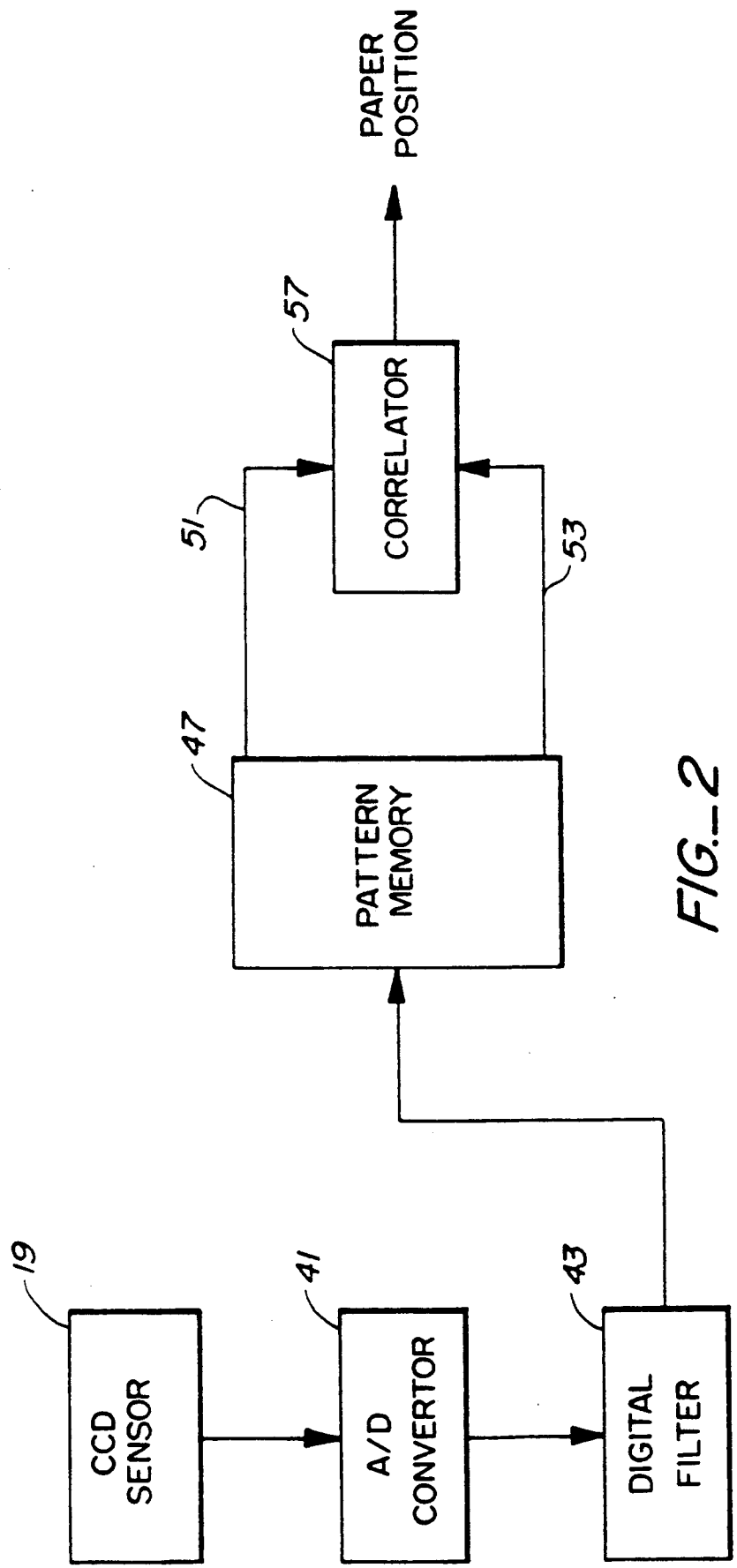
FIG._2

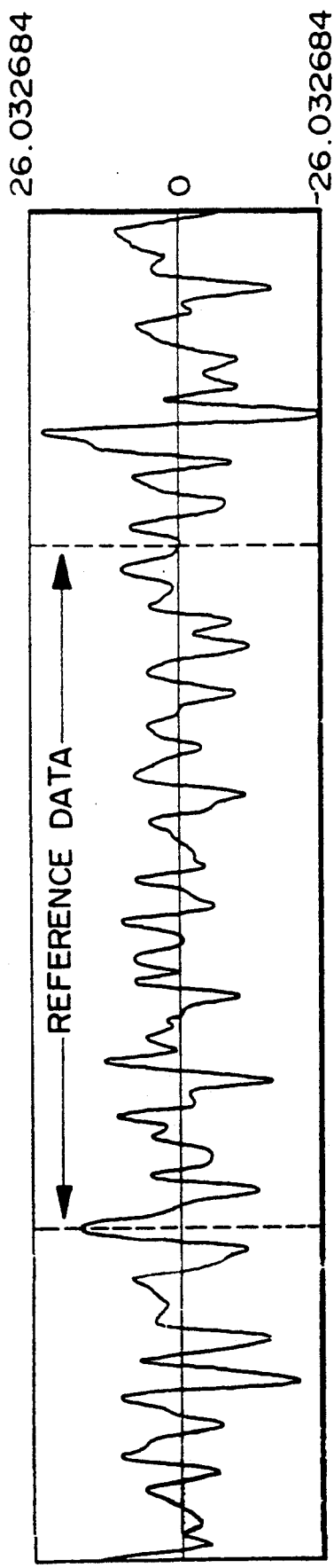
FIG._3
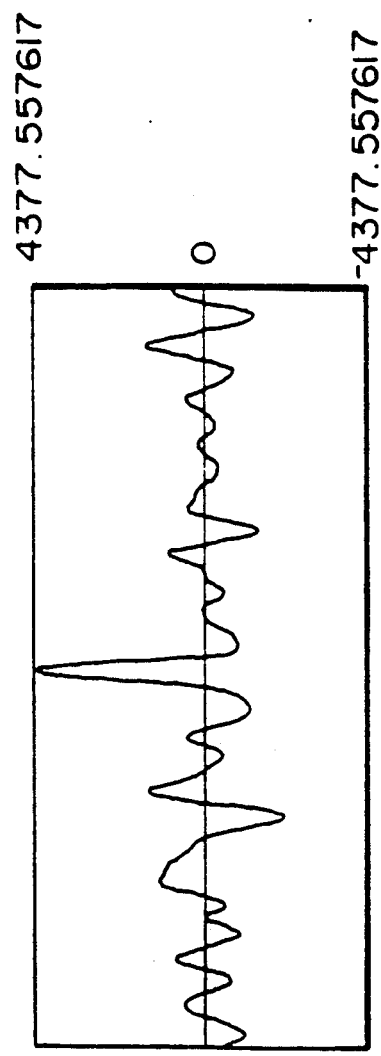
FIG._4

SHEET ADVANCEMENT CONTROL SYSTEM DETECTING FIBER PATTERN OF SHEET

BACKGROUND OF THE INVENTION

1. Field of the Invention

The present invention generally relates to printing machines for use with microprocessor-based computers and, more particularly, to page advancement control systems for use in such printers.

2. State of the Art

For printers that are used with personal computers and the like, it is important to provide print registration which is sufficiently accurate to avoid visually-observable defects. Avoidance of print mis-registrations is especially important in printers that print in multiple colors.

Printing errors of a cyclical nature are especially troublesome in printers such as inkjet printers that progressively print swaths of ink droplets across a page. Conventional inkjet printers include ones manufactured and sold by the Hewlett-Packard Company of Palo Alto, Calif. Examples of such printers include the Hewlett-Packard ThinkJet and DeskJet printers.

In operation, inkjet printers simultaneously print groups of ink droplets in vertical columns that travel horizontally across a page to form a swath. After a swath is printed, the page can be advanced and another swath can be printed. The printing may be textual or graphical. The spacing of ink droplets within a swath is controlled by the spacing of jets in the inkjet printhead and, in most inkjet printers, is highly accurate.

To avoid the creation of visually-discernable defects or "artifacts" when printing with inkjet printers, the separations between abutting swaths must be extremely precise. If there are gaps or overlaps between adjacent swaths, "banding" patterns may be created across a printed page. In fact, misalignment between adjacent swaths may be readily discerned for mis-registration distances as small as about one-half to one-tenth of a pixel's diameter at a density of about three hundred pixels per inch.

Print registration defects are also easily discerned in multi-color printing. For such printing, it is often necessary to precisely register primary color pixels with one another. In quantitative terms, pixel positioning for multi-color printing must be accurate to within about 0.1 mil to avoid visible defects and artifacts.

Theoretically, if a sheet is advanced in an inkjet printer by a distance exactly equal to one swath width, registration between printed swaths would be perfect. Heretofore, however, satisfactory accuracy has not been obtainable with conventional sheet advancement mechanisms in inkjet printers Inaccuracies in the control of sheet advancement in printers such as inkjet printers are usually attributable to the mechanical nature of the sheet advancement devices. Conventionally, sheet advancement distance is controlled by detecting the angle of rotation of a shaft connected to a drive roller or wheel. The accuracy of sheet advancement control systems is limited, however, by the uncertain nature of the mechanical interfaces between drive rollers and sheets at the microscopic level. In particular, variations in the effective radius of a drive roller may cause variations in the distance that a sheet is driven—even if the angle of rotation of the roller is detected exactly. Also, sheet positioning errors can arise from motor load variations produced by friction and stiction. Still further, sheet positioning errors can arise from backlash or windup in the drive train for a drive roller.

To overcome inaccuracies is paper positioning in printers such as conventional tractor printers, it has been suggested to provide a closed-loop direct feedback control system that senses so-called demarcation markings on a printed page. The suggested system is further described in U.S. Pat. No. 4,734,868 issued Mar. 29, 1988. Such systems are not always satisfactory, however, because the demarcation markings may detract from the appearance of text or graphics printed on a page.

SUMMARY OF THE INVENTION

Generally speaking, the present invention provides a sheet advancement control system for use in printers such as inkjet printers. In control systems according to the present invention, patterns such as fiber patterns in paper sheets are optically detected. Preferably, the optical detection system includes a light source for directing a beam of light onto a localized area of a sheet, a photosensitive detector for providing output signals that vary according to microscopic patterns within the localized areas of the sheet, means for determining cross-correlations between pairs of detected patterns as the sheet is advanced in a printer and for calculating displacements between correlated patterns to, thereby, detect the displacement of a sheet within the printer.

In operation of sheet advancement control systems according to the present invention, placement of adjacent ink swaths can be made accurately enough that registration errors and the like cannot be observed with the naked eye.

BRIEF DESCRIPTION OF THE DRAWINGS

The present invention can be further understood by reference to the following description and attached drawings which illustrate the preferred embodiment of the invention. For purposes of clarity, identical parts are given the same reference numbers in the various drawing figures. In the drawings:

FIG. 1 is a schematic diagram of a sheet advancement control system according to the present invention;

FIG. 2 is a functional block diagram of a sub-systems for use with the system of FIG. 1;

FIG. 3 is a graph showing an example of data processed by the sub-system of FIG. 2; and FIG. 4 is graph showing an example of a cross-correlation function employed by the system of FIG. 2.

DETAILED DESCRIPTION OF THE PREFERRED EMBODIMENT

Generally speaking, FIG. 1 shows a sheet advancement control system that includes a sub-system 7 for detecting the location of a sheet 8, and a sub-system 9 for advancing the sheet in response to signals from the position-detecting sub-system. Ordinarily, sheet 8 will comprise paper; however, the system of FIG. 1 is operable with sheets of material other than paper.

In the embodiment illustrated in FIG. 1, position-detecting sub-system 7 includes a light source 13 which is mounted for directing a beam of light onto a localized area 15 of sheet 8, a lens 17 for magnifying light which has passed through the localized area, a photosensitive device 19 for detecting the magnified light, and a pattern-identifying means 23 connected to receive output signals from the photosensitive device. Preferably, photosensitive device 19 includes at least one charge-coupled diode (CCD) sensor. Such sensors provide arrays of photosites that convert incident light to analog electrical signals.

Further in the system of FIG. 1, output signals from pattern-identifying means 23 are provided to a servo control system 27. As will be explained below, those pattern-identifying signals indicate the location of a sheet within the printer. The servo system also receives electrical reference signals that indicate the desired location of a sheet. Thus, the difference between the two input signals to the servo control system indicate the sheet positioning error. Output signals from the servo control system are provided to a motor 31 which, in turn, is connected to a shaft 33 for driving rollers 37 that contact sheet 8. In practice, motor 31 is a conventional stepper motor.

Operation of the system of FIG. 1 generally comprises the steps of locating the position of sheet 8 and then controllably advancing the sheet. Both steps (i.e., detecting sheet position and controlling sheet advancement) depend upon identifying changes in patterns that are observed at the localized areas of the sheet. In operation of sheet advancement sub-system 9, servo control system 27 receives signal information that indicates the current position of sheet 8 as well the desired position of the sheet Then, the servo control system controls the current furnished to motor 31 such that the sheet positioning error is minimized, thereby driving the sheet to a desired location. Because the servo control system repeatedly receives information as to the actual sheet location, the system may be described as a direct feedback control system.

Operation of the position-detecting sub-system of FIG. 1 is generally based upon the fact that blank white paper is not, in fact, uniform when observed at high magnifications, e.g., at magnifications of about 300 pixels per inch. The non-uniformities that are observed at such magnifications are ordinarily due to the presence of fibers, such as wood and/or cloth fibers, in paper sheets. In fact, when a paper sheet is viewed at such magnifications, fibers in the sheet have a wavy, grass-like appearance without uniform width or color.

More particularly, operation of the sheet displacement-detecting sub-system 7 in FIG. 1 involves sensing a pattern of fibers in the sheet at localized detection area 15, and then comparing the detected pattern to a previously-detected pattern. By identifying matches between consecutive patterns of fibers within the localized detection area, sub-system 7 can detect sheet displacement for periods between consecutive acquisitions of pattern information.

The pattern-identifying means 23 in FIG. 1 operates to identify fiber patterns based upon output signals from CCD sensor 19. In practice, those output signals provide values that represent the overall reflectance of sheet 8 (the "white" parts of the signals) as well as variations in reflectance due to the presence of fibers in the sheet (the "noise" part of the signal). The output signals from CCD sensor 19 are analog signals in the sense that their magnitudes vary continuously.

As will be described below, the analog output signals from CCD sensor 19 in FIG. 1 are processed to extract fiber pattern information, and then the extracted information is cross-correlated with previously obtained pattern information for purposes of detecting the location of a sheet. In practice, the computations required for the cross-corelations are made in periods of about 2 milliseconds (i.e., at a rate of about 500 hertz.)

As shown in FIG. 2, CCD sensor 19 is connected to an analog-to-digital (A/D) converter 41. The output of A/D convertor 41 is connected to a digital filter 43. In turn, the digital filter is connected to a memory device 47. In practice, the memory device is a conventional integrated circuit such as a random access memory (RAM) that can provide two streams of output signals. In the drawing, the first stream of output signals from memory device 47 is designated by the number 51; that stream can be understood to comprise signals representing "reference" pattern information. The second stream of output signals from memory device 47 is designated by the number 53, and it can be understood to comprise signals representing currently acquired pattern information.

In operation of the pattern-identifying means of FIG. 2, A/D convertor 41 converts the analog signals from CCD sensor 19 to digital signals whose magnitudes, as expressed by binary numbers, reflect the amplitudes of the analog signals. Then, digital filter 43 extracts fiber pattern information (i.e., the noise information) from the digital signals. The output of digital filter 43 is stored in memory device 47.

As further shown in FIG. 2, signal streams 51 and 53 are sent to a cross-correlation device 57. In practice, the cross-correlation device comprises special-purpose digital hardware that computes cross-correlation functions for pairs of detected fiber patterns that are represented by the signal streams. Although cross-correlation device 57 could be implemented entirely in software, it is usually implemented, at least partially, in hardware, including a conventional microprocessor-based computer. As will be explained below, device 27 computes the cross-correlation functions as sums of partial products that for various displaced positions of sets of input signals.

FIGS. 3 and 4 graphically depict the operation of cross-correlation device 57. For purposes of explanation, the signals in the drawings are shown as continuous signals; however, those signals should be understood to be derived from discrete-time signals. Conversion from discrete-time samples to continuous signals can be accomplished, for example, by employing a raised cosine window convolved with the sinc function.

FIG. 3 shows an example of output signals from CCD sensor 19 in the system of FIG. 1. Generally speaking, the output signals from the CCD sensor vary according to the fiber structure viewed in the localized area 15 of sheet 8. In the graph, the vertical axis represents the amplitude of the signal information and the horizontal axis represents distance. In other words, the graph represents the changes in output signals from CCD sensor 19 as localized area 15 moves due to displacement of sheet 8. The middle section of the graph in FIG. 3 is designated as the above-mentioned reference data. In essence, the reference data comprises a pattern that is used for matching with data which is acquired from the CCD sensor after sheet 8 is moved.

FIG. 4 shows an example of a cross-correlation function which has been computed for two data sets that are essentially the same except for a displacement (i.e., shift) along the horizontal axis. That is, the two data sets both contain the reference data. It will be noted that the cross-correlation function has a shape somewhat similar to the sinc function. The primary peak of the cross-correlation function occurs at the relative displacement location at which the two data sets best match (i.e., correlate). Thus, the primary peak of the cross-correlation function can be used by the cross-correlation device 57 to calculate the distance that sheet 8 has been advanced in the system of FIG. 1. In practice, the system is sufficiently accurate to detect sheet displacements within about 0.0001 inches. (Normally, a pixel has a diameter of about 0.0033 inch.)

As sheet 8 continues to advance in the system of FIG. 1, the net displacement between consecutive patterns is computed and the last-acquired pattern is stored in memory device 47. The stored pattern is subsequently available for cross-correlation with the next acquired pattern. Accordingly, the system of FIG. 1 can measure sheet displacements that are longer than the field of view of the CCD sensor.

At this juncture, it may be noted that only a small fraction of sheet 8 is "seen" at any given time by CCD sensor 19 of FIG. 1. However, as long as there is a significant amount of common information between two consecutively viewed patterns, the system can provide meaningful pattern matches (i.e., cross-correlations) and, hence, can accurately detect the sheet advancement distance. It may also be appreciated that the above-described pattern identification process is not affected by printing or other marks on a page. Such markings can, in fact, assist in the pattern matching process. Thus, the system of FIG. 1 can operate properly when pre-printed forms or letterhead stationery are being printed.

The foregoing has described the principles, preferred embodiments and modes of operation of the present invention. However, the invention should not be construed as limited to the particular embodiments discussed. For example, the invention can be used in conjunction with the printing of sheets which are not paper sheets as long as the sheets provide microscopically detectable patterns. In this regard, it should be noted that surface coating on typical "transparencies" used for overhead projections normally provide sufficient pattern information for use by the above-described system. As another example, it should be understood that the system of FIG. 1 can be used to detect reflected light. In that case, the CCD sensor 19 of FIG. 1 would be located on the same side of the sheet as light source 13.

Thus, it will be apparent to workers skilled in the art that either arrangement of source and detector may be used. Thus, the above-described embodiments should be regarded as illustrative rather than restrictive. It should be appreciated that variations may be made in those embodiments by workers skilled in the art without departing from the spirit or scope of the present invention as defined by the following claims.

What is claimed is:

1. A sheet advancement control system for use in printers such as inkjet printers, comprising:
   light source means for directing a beam of light onto a localized area of a sheet;
   magnifier means for magnifying the light is incident on the localized area of the sheet;
   photosensitive fiber pattern detecting means for detecting the magnified light and for providing output signals that vary according to fiber patterns within the localized area of the sheet;
   correlator means for determining cross-correlations between pairs of detected fiber patterns as the sheet is advanced in a printer; and
   displacement detecting means connected to the correlator means for detecting displacement between correlated patterns, thereby, to detect displacements of a sheet as it advances within the printer.

2. A sheet advancement control system according to claim 1 wherein the photosensitive means includes at least one charge-coupled diode for receiving the magnified light.

3. A sheet advancement control system according to claim 1 wherein the photosensitive means provides output signals that are analog signals.

4. A sheet advancement control system according to claim 3 further including analog-to-digital convertor means connected to the output of the photosensitive means for converting the analog signals to digital signals.

5. A sheet advancement control system according to claim 4 further including digital filter means connected to the analog-to-digital convertor means for extracting pattern information from the digital signals.

6. A sheet advancement control system according to claim 5 wherein the digital filter means operates to extract variations in the digital signals that result from the presence of microscopic patterns in the localized areas of the sheet which are illuminated by the light source means.

7. A sheet advancement control system according to claim 5 further including memory means connected to the digital filter means for storing the extracted pattern information.

8. A sheet advancement control system according to claim 6 further including memory means connected to store the extracted variations in the digital signals as pattern information.

9. A sheet advancement control system according to claim 7 wherein the memory means is a random access memory.

10. A sheet advancement control system according to claim 8 wherein the memory means is a random access memory.

11. A sheet advancement control system according to claim 1 wherein the correlator means is operative to detect the location of the primary peak of the computed cross-correlation functions.

12. A sheet advancement control system according to claim 11 wherein the correlator means is further operative to detect the displacement of a sheet that has advanced in a printer by detecting the relative displacement of the peak of the cross-correlation function computed for two or more locations of the sheet.

* * * * *